United States Patent
Agarwal et al.

(10) Patent No.: US 8,538,768 B2
(45) Date of Patent: Sep. 17, 2013

(54) METHODS AND APPARATUSES FOR DELIVERY OF ADVICE TO MOBILE/WIRELESS DEVICES

(75) Inventors: Anuj Agarwal, San Francisco, CA (US); Nitin Ahuja, Redwood City, CA (US); Ebbe Altberg, Mill Valley, CA (US); Scott Faber, San Francisco, CA (US); Mark Arthur Buchler Halstead, Auckland (NZ); Sean Van der Linden, Berkeley, CA (US)

(73) Assignee: Ingenio LLC, San Francisco, CA (US)

( * ) Notice: Subject to any disclaimer, the term of this patent is extended or adjusted under 35 U.S.C. 154(b) by 2008 days.

(21) Appl. No.: 11/123,566

(22) Filed: May 5, 2005

(65) Prior Publication Data

US 2006/0184378 A1    Aug. 17, 2006

Related U.S. Application Data

(63) Continuation-in-part of application No. 11/077,655, filed on Mar. 10, 2005, now Pat. No. 7,428,497.

(60) Provisional application No. 60/653,708, filed on Feb. 16, 2005.

(51) Int. Cl.
G06Q 10/00   (2012.01)
G06Q 99/00   (2006.01)
G06F 17/00   (2006.01)
G06N 5/04    (2006.01)

(52) U.S. Cl.
USPC .............................. 705/1.1; 705/319; 706/60

(58) Field of Classification Search
USPC ................. 705/1, 1.1, 319; 379/242, 265.01; 706/60
See application file for complete search history.

(56) References Cited

U.S. PATENT DOCUMENTS

| 4,313,035 A | 1/1982 | Jordan et al. |
| 4,577,065 A | 3/1986 | Frey et al. |

(Continued)

FOREIGN PATENT DOCUMENTS

| AU | 699785 | 5/1995 |
| GB | 2329046 A | 10/1999 |

(Continued)

OTHER PUBLICATIONS

U.S. Appl. No. 09/596,466, filed Jun. 19, 2000, Agdeppa, Hector A.

(Continued)

*Primary Examiner* — Jonathan Ouellette
*Assistant Examiner* — Amanda Kirlin
(74) *Attorney, Agent, or Firm* — Greenberg Traurig, LLP

(57) ABSTRACT

Methods and apparatuses to connect consumers to diverse advice sources of experts. In one embodiment, a method includes: providing a list of experts to a mobile device via a wireless media channel for presentation to a consumer; responsive to receiving from the mobile device a selection of one expert from the list of experts, initiating a telephonic connection between the expert and the consumer prior to the consumer submitting a question for advice. In one example, the list includes information to indicate whether one or more of the experts are individually available to telephonically communicate with the consumer at a time when the list is provided to the consumer. In one example, initiating the telephonic connection includes: initiating a first call to the consumer; initiating a second call to the expert; and joining the first and second calls to make the telephonic connection between the expert and the consumer.

16 Claims, 7 Drawing Sheets

(56) References Cited

U.S. PATENT DOCUMENTS

| | | |
|---|---|---|
| 4,631,428 A | 12/1986 | Grimes |
| 4,645,873 A | 2/1987 | Chomet |
| 4,677,434 A | 6/1987 | Fascenda |
| 4,723,283 A | 2/1988 | Nagasawa et al. |
| 4,751,669 A | 6/1988 | Sturgis et al. |
| 4,752,675 A | 6/1988 | Zetmeir |
| 4,847,890 A | 7/1989 | Solomon et al. |
| 5,058,152 A | 10/1991 | Solomom et al. |
| 5,148,474 A | 9/1992 | Haralambopoulos et al. |
| 5,155,743 A | 10/1992 | Jacobs |
| 5,319,542 A | 6/1994 | King, Jr. et al. |
| 5,325,424 A | 6/1994 | Grube |
| 5,347,632 A | 9/1994 | Filepp et al. |
| 5,359,508 A | 10/1994 | Rossides |
| 5,361,295 A | 11/1994 | Solomon et al. |
| 5,369,694 A | 11/1994 | Bales et al. |
| 5,448,625 A | 9/1995 | Lederman |
| 5,453,352 A | 9/1995 | Tachibana |
| 5,497,502 A | 3/1996 | Castille |
| 5,524,146 A | 6/1996 | Morrisey et al. |
| 5,537,314 A | 7/1996 | Kanter |
| 5,539,735 A | 7/1996 | Moskowitz |
| 5,555,298 A | 9/1996 | Jonsson |
| 5,557,677 A | 9/1996 | Prytz |
| 5,574,780 A | 11/1996 | Andruska et al. |
| 5,574,781 A | 11/1996 | Blaze |
| 5,589,892 A | 12/1996 | Knee et al. |
| 5,590,197 A | 12/1996 | Chen et al. |
| 5,596,634 A | 1/1997 | Fernandez et al. |
| 5,602,905 A | 2/1997 | Mettke |
| 5,608,786 A | 3/1997 | Gordon |
| 5,615,213 A | 3/1997 | Griefer |
| 5,619,148 A | 4/1997 | Guo |
| 5,619,570 A | 4/1997 | Tsutsui |
| 5,619,725 A | 4/1997 | Gordon |
| 5,619,991 A | 4/1997 | Sloane |
| 5,634,012 A | 5/1997 | Stefik et al. |
| 5,638,432 A | 6/1997 | Wille et al. |
| 5,675,734 A | 10/1997 | Hair |
| 5,694,549 A | 12/1997 | Carlin et al. |
| 5,701,419 A | 12/1997 | McConnell |
| 5,710,887 A | 1/1998 | Chelliah et al. |
| 5,712,979 A | 1/1998 | Graber et al. |
| 5,715,314 A | 2/1998 | Payne et al. |
| 5,717,860 A | 2/1998 | Graber et al. |
| 5,718,247 A | 2/1998 | Frankel |
| 5,721,763 A | 2/1998 | Joseph et al. |
| 5,722,418 A | 3/1998 | Bro |
| 5,724,424 A | 3/1998 | Gifford |
| 5,734,961 A | 3/1998 | Castille |
| 5,740,231 A | 4/1998 | Cohn et al. |
| 5,745,681 A | 4/1998 | Levine et al. |
| 5,768,348 A | 6/1998 | Solomon et al. |
| 5,768,521 A | 6/1998 | Dedrick |
| 5,774,534 A | 6/1998 | Mayer |
| 5,778,367 A | 7/1998 | Wesinger, Jr. et al. |
| 5,781,894 A | 7/1998 | Patrecca et al. |
| 5,794,221 A | 8/1998 | Egendorf |
| 5,802,502 A | 9/1998 | Gell et al. |
| 5,809,119 A | 9/1998 | Tonomura et al. |
| 5,809,145 A | 9/1998 | Slik et al. |
| 5,812,769 A | 9/1998 | Graber et al. |
| 5,818,836 A | 10/1998 | DuVal |
| 5,819,092 A | 10/1998 | Ferguson et al. |
| 5,819,267 A | 10/1998 | Uyama |
| 5,819,271 A | 10/1998 | Mahoney et al. |
| 5,819,285 A | 10/1998 | Damico et al. |
| 5,825,869 A | 10/1998 | Brooks et al. |
| 5,825,876 A | 10/1998 | Peterson, Jr. |
| 5,832,523 A | 11/1998 | Kania et al. |
| 5,835,896 A | 11/1998 | Fisher et al. |
| 5,842,212 A | 11/1998 | Ballurio et al. |
| 5,850,433 A | 12/1998 | Rondeau |
| 5,860,068 A | 1/1999 | Cook |
| 5,862,223 A | 1/1999 | Walker et al. |
| 5,864,871 A | 1/1999 | Kitain et al. |
| RE36,111 E | 2/1999 | Neville |
| 5,870,744 A | 2/1999 | Sprague |
| 5,878,130 A | 3/1999 | Amdrews et al. |
| 5,884,029 A | 3/1999 | Brush et al. |
| 5,884,032 A | 3/1999 | Bateman et al. |
| 5,884,272 A | 3/1999 | Walker et al. |
| 5,884,282 A | 3/1999 | Robinson |
| 5,889,774 A | 3/1999 | Mirashrafi et al. |
| 5,890,138 A | 3/1999 | Godin et al. |
| 5,893,077 A | 4/1999 | Griffin |
| 5,901,214 A | 5/1999 | Shaffer et al. |
| 5,903,635 A | 5/1999 | Kaplan |
| 5,907,677 A | 5/1999 | Glenn et al. |
| 5,911,132 A | 6/1999 | Sloane |
| 5,914,951 A | 6/1999 | Bentley et al. |
| 5,924,082 A | 7/1999 | Silverman et al. |
| 5,937,390 A | 8/1999 | Hyodo |
| 5,940,471 A | 8/1999 | Homayoun |
| 5,940,484 A | 8/1999 | DeFazio et al. |
| 5,946,646 A | 8/1999 | Schena et al. |
| 5,960,069 A | 9/1999 | Felger |
| 5,960,416 A | 9/1999 | Block |
| 5,963,861 A | 10/1999 | Hanson |
| 5,974,141 A | 10/1999 | Saito |
| 5,974,398 A | 10/1999 | Hanson et al. |
| 5,982,863 A | 11/1999 | Smiley et al. |
| 5,987,102 A | 11/1999 | Elliott et al. |
| 5,987,118 A | 11/1999 | Dickerman et al. |
| 5,987,430 A | 11/1999 | Van Horne et al. |
| 5,991,394 A | 11/1999 | Dezonno et al. |
| 5,991,735 A * | 11/1999 | Gerace .................. 705/7.33 |
| 5,999,609 A | 12/1999 | Nishimura |
| 5,999,611 A | 12/1999 | Tatchell et al. |
| 6,006,197 A | 12/1999 | d-Eon et al. |
| 6,011,794 A | 1/2000 | Mordowitz et al. |
| 6,014,644 A | 1/2000 | Erickson |
| 6,026,087 A | 2/2000 | Mirashrafi et al. |
| 6,026,148 A | 2/2000 | Dworkin et al. |
| 6,026,400 A | 2/2000 | Suzuki |
| 6,028,601 A | 2/2000 | Machiraju et al. |
| 6,029,141 A | 2/2000 | Bezos et al. |
| 6,035,021 A | 3/2000 | Katz |
| 6,046,762 A | 4/2000 | Sonesh et al. |
| 6,055,513 A | 4/2000 | Katz et al. |
| 6,058,379 A | 5/2000 | Odom et al. |
| 6,064,978 A | 5/2000 | Gardener et al. |
| 6,130,933 A | 10/2000 | Miloslavsky |
| 6,144,670 A | 11/2000 | Sponaugle et al. |
| 6,167,449 A | 12/2000 | Arnold et al. |
| 6,173,279 B1 | 1/2001 | Levin et al. |
| 6,175,619 B1 | 1/2001 | DeSimone |
| 6,185,194 B1 | 2/2001 | Musk et al. |
| 6,188,673 B1 | 2/2001 | Bauer et al. |
| 6,188,761 B1 | 2/2001 | Dickerman et al. |
| 6,192,050 B1 * | 2/2001 | Stovall .................. 370/389 |
| 6,199,096 B1 | 3/2001 | Mirashrafi et al. |
| 6,212,192 B1 | 4/2001 | Mirashrafi et al. |
| 6,219,045 B1 | 4/2001 | Leahy et al. |
| 6,223,165 B1 | 4/2001 | Lauffer |
| 6,230,287 B1 | 5/2001 | Pinard et al. |
| 6,243,684 B1 | 6/2001 | Stuart et al. |
| 6,259,774 B1 | 7/2001 | Miloslavsky |
| 6,269,336 B1 | 7/2001 | Ladd et al. |
| 6,269,361 B1 | 7/2001 | Davis et al. |
| 6,292,799 B1 | 9/2001 | Peek et al. |
| 6,298,056 B1 | 10/2001 | Pendse |
| 6,301,342 B1 | 10/2001 | Ander et al. |
| 6,304,637 B1 | 10/2001 | Mirashrafi et al. |
| 6,310,941 B1 | 10/2001 | Crutcher et al. |
| 6,314,402 B1 | 11/2001 | Monaco et al. |
| 6,385,583 B1 | 5/2002 | Ladd et al. |
| 6,393,117 B1 | 5/2002 | Trell |
| 6,400,806 B1 | 6/2002 | Uppaluru |
| 6,404,864 B1 | 6/2002 | Evslin et al. |
| 6,404,877 B1 | 6/2002 | Bolduc et al. |
| 6,404,884 B1 | 6/2002 | Marwell et al. |
| 6,430,276 B1 | 8/2002 | Bouvier et al. |
| 6,434,527 B1 | 8/2002 | Horvitz |

| | | |
|---|---|---|
| 6,463,136 B1 | 10/2002 | Malik |
| 6,470,079 B1 | 10/2002 | Benson |
| 6,470,317 B1 | 10/2002 | Ladd et al. |
| 6,484,148 B1 | 11/2002 | Boyd |
| 6,493,437 B1 | 12/2002 | Olshansky |
| 6,493,671 B1 | 12/2002 | Ladd et al. |
| 6,493,673 B1 | 12/2002 | Ladd et al. |
| 6,510,417 B1 | 1/2003 | Woods et al. |
| 6,523,010 B2 | 2/2003 | Lauffer |
| 6,529,878 B2 | 3/2003 | De Rafael et al. |
| 6,539,359 B1 | 3/2003 | Ladd et al. |
| 6,546,372 B2 | 4/2003 | Lauffer |
| 6,549,889 B2 * | 4/2003 | Lauffer .......................... 705/8 |
| 6,560,576 B1 | 5/2003 | Cohen et al. |
| 6,570,870 B1 | 5/2003 | Berstis |
| 6,571,279 B1 * | 5/2003 | Herz et al. ................... 709/217 |
| 6,606,376 B1 | 8/2003 | Trell |
| 6,625,595 B1 | 9/2003 | Anderson et al. |
| 6,636,590 B1 | 10/2003 | Jacob et al. |
| 6,658,389 B1 | 12/2003 | Alpdemir |
| 6,757,364 B2 | 6/2004 | Newkirk |
| 6,769,020 B2 | 7/2004 | Miyazaki et al. |
| 6,836,225 B2 | 12/2004 | Lee et al. |
| 6,847,992 B1 | 1/2005 | Haitsuka et al. |
| 6,968,174 B1 | 11/2005 | Trandal et al. |
| 7,092,901 B2 | 8/2006 | Davis et al. |
| 7,249,045 B2 | 7/2007 | Lauffer |
| 7,366,683 B2 * | 4/2008 | Altberg et al. ............. 705/14.64 |
| 8,027,878 B2 | 9/2011 | Wong et al. |
| 2001/0032247 A1 | 10/2001 | Kanaya |
| 2001/0036822 A1 | 11/2001 | Mead et al. |
| 2001/0037283 A1 | 11/2001 | Mullaney |
| 2001/0048737 A1 | 12/2001 | Goldberg et al. |
| 2002/0003867 A1 | 1/2002 | Rothschild et al. |
| 2002/0029241 A1 | 3/2002 | Yokono et al. |
| 2002/0038233 A1 | 3/2002 | Shubov et al. |
| 2002/0065959 A1 | 5/2002 | Kim et al. |
| 2002/0087565 A1 | 7/2002 | Hoekman et al. |
| 2002/0095331 A1 | 7/2002 | Osmar et al. |
| 2002/0107697 A1 | 8/2002 | Jensen |
| 2002/0120554 A1 | 8/2002 | Vega |
| 2002/0133571 A1 | 9/2002 | Jacob et al. |
| 2002/0161646 A1 * | 10/2002 | Gailey et al. ................... 705/14 |
| 2002/0191762 A1 | 12/2002 | Benson |
| 2002/0193094 A1 | 12/2002 | Lawless et al. |
| 2003/0043981 A1 | 3/2003 | Lurie et al. |
| 2003/0046161 A1 | 3/2003 | Kamangar et al. |
| 2003/0055984 A1 | 3/2003 | Shimakawa et al. |
| 2003/0220866 A1 | 11/2003 | Pisaris-Henderson |
| 2003/0223565 A1 | 12/2003 | Montemer |
| 2003/0225682 A1 | 12/2003 | Montemer |
| 2004/0006511 A1 | 1/2004 | Montemer |
| 2004/0010518 A1 | 1/2004 | Montemer |
| 2004/0023644 A1 | 2/2004 | Montemer |
| 2004/0024846 A1 * | 2/2004 | Randall et al. ................ 709/219 |
| 2004/0096110 A1 | 5/2004 | Yogeshwar et al. |
| 2004/0162757 A1 | 8/2004 | Pisaris-Henderson |
| 2004/0204997 A1 | 10/2004 | Blaser et al. |
| 2004/0234049 A1 | 11/2004 | Melideo |
| 2004/0234064 A1 | 11/2004 | Melideo |
| 2004/0236441 A1 | 11/2004 | Melideo |
| 2004/0254859 A1 | 12/2004 | Aslanian, Jr. |
| 2004/0258048 A1 | 12/2004 | Melideo |
| 2004/0260413 A1 | 12/2004 | Melideo |
| 2005/0010795 A1 | 1/2005 | Tagawa et al. |
| 2005/0021744 A1 | 1/2005 | Haitsuka et al. |
| 2005/0048961 A1 | 3/2005 | Ribaudo et al. |
| 2005/0065811 A1 | 3/2005 | Chu et al. |
| 2005/0080878 A1 | 4/2005 | Cunningham et al. |
| 2005/0203799 A1 | 9/2005 | Faber et al. |
| 2005/0209874 A1 | 9/2005 | Rossini |
| 2005/0220289 A1 | 10/2005 | Reding |
| 2006/0075055 A1 | 4/2006 | Littlefield |
| 2006/0095343 A1 | 5/2006 | Clark et al. |
| 2006/0259365 A1 | 11/2006 | Agarwal et al. |
| 2007/0179867 A1 | 8/2007 | Glazer et al. |
| 2008/0263446 A1 | 10/2008 | Altberg et al. |
| 2009/0006174 A1 | 1/2009 | Lauffer |
| 2009/0067599 A1 | 3/2009 | Agarwal et al. |
| 2010/0208028 A1 | 8/2010 | Lauffer |

FOREIGN PATENT DOCUMENTS

| | | |
|---|---|---|
| JP | 409233441 A | 9/1997 |
| JP | 409319812 A | 12/1997 |
| WO | WO 97/05733 | 2/1997 |
| WO | WO 98/02835 | 1/1998 |
| WO | WO 98/04061 | 1/1998 |
| WO | WO 98/13765 | 4/1998 |
| WO | WO 98/38558 | 9/1998 |
| WO | 9847295 | 10/1998 |
| WO | WO 0176173 A2 * | 10/2001 |
| WO | WO 02/44870 | 6/2002 |
| WO | 02088880 | 11/2002 |
| WO | WO 03025789 A1 * | 3/2003 |

OTHER PUBLICATIONS

U.S. Appl. No. 60/198,642, filed Apr. 20, 2000, Rothschild et al.
U.S. Appl. No. 60/471,535, filed May 19, 2003, Melideo.
PCT/US01/51181, Mar. 7, 2003.
Abhaya Asthana and Paul Krzyzanowski, "A Small Domain Communications System for Personalized Shopping Assistance," Proceedings of ICPWC'94, Publication No. 0-7803-1996-6/94,IEEE, 1994, pp. 199-203.
Amir Herzberg, et al., "MiniPay: Charging Per Click on the Web," Computer Networks and ISDN Systems 29, (Sep. 1997) vol. 29, pp. 939-951.
Answers.com Web Page (www.answers.com).
"Applying Technology News," Accounting Technology, p. 14 (Feb./Mar. 1997).
Aspect Telecomm: Aspect Integrates the Web into the Call Center, M2 Presswire, Aug. 1996.
Barbara Jarvie, "Company Devoted to Hot-Line Support", Computer Reseller News, Oct. 21, 1991, p. 48.
Big Green Blog: Jan. 2005 Archives, Feb. 21, 2006.
Caring for Customers: Real-Time text chat and telephony provide personalized customer support and turn queries into sales leads, Internet World Media, Sep. 1999.
Chris Ott, "Making Good on the Information Economy". Denver Business Journal, Dec. 17, 1999, p. 27.
Christina Wood, "Hidden Cost of Tech Support", PC World, May 1995, pp. 143-152 & p. 156.
Collett, Stacey & Julie King, "Why Online Browsers Don't Become Buyers," Computerworld, vol. 33, No. 48, p. 14 (Nov. 1999).
"Connecting to On-Line Car Shoppers: Auto Sellers Use Netcall Internet Call-Button Technology to Turn Clicks into Interactive Sales", Business Wire, p. 4089., Jul. 1999.
Cynthia Hodgson, "Online Expert Databases & Services", Econtent, Dec. 1999, p. 48-53.
Davey, Tom, "Wheeling and Dealing Online", PC Week, vol. 13, No. 45, pp. 1, 129., Nov. 1996.
E.J. Addeo, A.B. Dayao, A.D. Gelman and V.F. Massa, "An Experimental Multi-Media Bridging System," Frontiers in Computer Communications Technology, Computer Communications Review, vol. 17, No. 5, Aug. 11-13, 1987, pp. 236-242.
Edith Herman, "US Courts to Launch First Federal 900 Service," Federal Computer Week, Sep. 28, 1992, p. 8.
Ellen Greenbalt, "Have you ever wondered . . . ", Datamation, Oct. 1997, p. 12.
EXP.com Web Site at www.exp.com/.
"Expertcity.com Launches Premier Online Marketplace for Expert Services," PR Newswire (Aug. 1999).
For Telesphere's Clients, Dial '1-900-TUF LUCK', Business Week, Sep. 9, 1991, 88.
Franco Mercalli, et al., "TheESSAI Teleshopping System: An Example of Broadband Multimedia Application," Publication No. 0-7803-1820-X/94, IEEE, pp. 572-576 (1994).
Gregory Dalton, "Rent-An-Expert on the Web," Information Week p. 75 (Sep. 6, 1999).

Healey, Jon, "From A to Z, You Can Sell Advice Online." Retrieved from http://www.mercurycenter.com on Oct. 24, 2000, published on Nov. 7, 1999.

Infomarkets.com Web Site (www.infomarkets.com).

Information about Expertcity.com retrieved from the Internet [http://www.expertcity.com] on Nov. 6, 2000.

Information about Expertcity.com retrieved from the Internet [URL:http://www.expertcity.com] on Apr. 9, 2000.

Information, Bid and Asked, Forbes, Aug. 20, 1990, 92.

Ingenio Press Archives for 2004, www.ingenio.com, Feb. 21, 2006.

Intellect Exchange Web Site (www.intellectexchange.com).

"Introducing 1-800-FREE411: First Nationwide Free Telephone Directory Assistance Service" Jingle Networks, Inc., Huntington Beach, Calif., Sep. 20, 2005.

ISDN Tutorial: Definitions, http://www.ralphb.net/ISDN/defs.html (Apr. 21, 2000).

ISDN Tutorial:Interfaces, http://www.ralphb.net/ISDN/ifaces.html, printed on Apr. 21, 2000.

J. Sairamesh, et al., "NetBazaar: Networked Electronic Markets for Trading Computation and Information Services", Research and Advanced Technology for Digital Libraries, Second European Conference, ECDL 1998, pp. 839-856 (Sep. 21-23, 1998).

J.W.R. Griffiths, et al., "Multimedia Communication in a Medical Environment", IEEE 1991 Singapore I.C. on Networks, p. 166 (8 pgs.).

"Jambo Launches to Connect People and businesses From the Internet to the Phone", Agoura Hills, Calif. May 3, 2005.

"Jambo Names Netzero Co-founder Stacy Haitsuka to New Post of Chief Information Officer", Agoura Hills, Calif., Jul. 5, 2005.

"Jambo Receives $5 Million in Financiing from Kline Hawkes & Co., Westlake Venture Partners, Others", Agoura Hills, Calif., Oct. 17, 2005.

Jeff Pelline, "Net Firm to Connect Users by Phone," CNET News. com [retrieved from http://new.cnet.com] (Oct. 24, 2001) published Nov. 8, 1999.

Joann M. Wasik, "Information for Sale: Commercial Digital Reference and AskA Service", Virtual Reference Desk, Sep. 20, 1999, at www. vrd.org/AskA/commAskA.html.

John Robinson, "Attachmate Ready to Answer Net Questions", Network World, Apr. 8, 1996, p. 37.

Joseph Menn, "An Expert? There's Now a Home for You on the Internet", Los Angeles Times (retrieved from http://denverpost.com on Oct. 24, 2001).

Keen.com, Inc. v. 0.InfoRocket.com, Inc., Complaint for Patent Infringement, Trade Dress Infringement and Unfair Competition; Demand for Jury Trial filed Aug. 31, 2001, pp. 1-8 plus 17 pgs. of attachments.

Keen.com, Inc. v. InfoRocket.com, Inc., Preliminary Injunction Hearing, pp. 286-289 (Jan. 8, 2002).

Keen.com Feb. 4, 2006.

Keen.com Plans Web Service Allowing Customers to Hold Private Phone Chats, Don Clark, Wall Street Journal, Nov. 8, 1999.

Keen.com raises $60 Million from Prestigious . . . , Business Wire, Jan. 11, 2000.

"Keen.com™ Launches First Live Answer Community™, Connects People with Information to Share Over Their Standard Telephone", Press Release [retrieved from http://keen.com] (Oct. 24, 2000), published Nov. 8, 1999.

Kiyoshi Kabeya, Akihiro Tomihisa and Sueharu Miyahara, "A New Teleconsultation Terminal System Using ISDN," NTT Review, vol. 3, No. 4, Jul. 1991, pp. 37-43.

L. F. Ludwig and D. F. Dunn, "Laboratory for Emulation and Study of Integrated and Coordinated Media Communication," Conference on Office Communication Systems, Mar. 23-25, 1988, Sponsored by ACM SIGOIS and IEEECS TC-OA in cooperation with IFIP W.G. 8.4, pp. 283-291.

Linda Littleton, "Meet the Shadowy Future," Proceedings of ACM SIGUCCS User Services Conference XXII Ypsilanti, Michigan Oct. 16-19, 1994, pp. 205-210.

"Lucent Technology and Netscape Team to Deliver Lucent Ecommerce Solutions," Business Wire, Sep. 1998.

Masahiko Hase, Shuji Kawakubo and Mineo Shoman, "Advanced Videophone System Using Synchronized Video Filing Equipment," NTT Review, vol. 3, No. 4 Jul. 1991, pp. 29-36.

Michael Kanellos, "Do You Want to Know the Meaning of Life?", Computer Reseller News, Mar. 3, 1997, pp. 72-74.

Michael Rogers et al, "Experts Abound at New Web Sites", Library Journal, Mar. 1, 2000, pp. 22-24.

"Netcall Internet Call Buttons Enhance E-Commerce Customer Service and Sales", PR Newswire, p. 7431, Aug. 1999.

PCT Search Report for PCT Application No. PCT/US01/48284, filed Oct. 30, 2001 (corresponding to U.S. Appl. No. 09/702,217) mailed May 13, 2002 (7 pgs.).

Qcircuit Web Site (www.qcircuit.com).

Richard A Kuehn, "The Voice of Technology," Credit World, pp. 20-23 (Jul. 1994).

Sell and buy advice online, The Ottawa Citizen, Nov. 29, 1999.

"Surfbrains.com: Brains online save time & money", M2 Presswire, Jul. 11, 2000.

Tehrani, Rich, "e-Rip Van Winkle and the 60 Second Nap," Call Center Solution, vol. 18, No. 2, pp. 16(3)., Aug. 1999.

Telecommunications Buyers Guide and Directory, Editor & Publisher, pp. 29TC-38TC, Feb. 1994.

The Web Site at www.experts-exchange.com/.

The web-site at www.allexperts.com.

"TriNet's, Help Me, I'm Stuck, Internet Voice Button Services Pushes Web Pages to Online Users." Business Wire, Mar. 1998.

"USA Global Link Brings Interactively to Internet Shopping," Business Wire, Oct. 1998.

"UpSnap Selects LookSmart to Sell Premium Listings on FREE 411 Service for Text-Enabled Cell Phones", Nov. 4, 2004.

"Walker Digital Issued Landmark U.S. Patent No. 5,862,223 for Global Internet Marketplace for Experts", Business Wire, Jan. 26, 1999.

Welcome to the Electronic Emissary Project's WebCenter at www. tapr.org/emmisary/.

"Welcome to Jambo—the leader in Pay-per-Call Solutions" (search results) Oct. 17, 2005.

When Business Plan and Real World Clash, Wall Street Journal, Jun. 9, 1999, B1.

William H. Chimiak, et al, "Multimedia Collaborative Remote Consultation Tools Via Gigabit WAN in Teleradiology", IEEE 1994, Phoenix, p. 417 (7 pgs.).

USPTO Transaction History of U.S. Appl. No. 08/702,833, filed Aug. 23, 1996, entitled "Method for Establishing Anonymous Communication Links," now U.S. Patent No. 5,907,677.

USPTO Transaction History of U.S. Appl. No. 09/414,710, filed Oct. 8, 1999, entitled "System for Providing Services in Real-Time Over the Internet."

USPTO Transaction History of U.S. Appl. No. 09/488,130, filed Jan. 20, 2000, entitled "Method and Apparatus to Connect Consumer to Expert," now U.S. Patent No. 6,223,165.

USPTO Transaction History of U.S. Appl. No. 09/733,872, filed Dec. 8, 2000, entitled "Assistance Method and Apparatus," now U.S. Patent No. 6,523,010.

USPTO Transaction History of U.S. Appl. No. 09/782,925, filed Feb. 13, 2001, entitled "Assistance Method and Apparatus," now U.S. Patent No. 6,549,889.

USPTO Transaction History of U.S. Appl. No. 09/782,984, filed Feb. 13, 2001, entitled "Assistance Method and Apparatus," now U.S. Patent No. 6,546,372.

USPTO Transaction History of U.S. Appl. No. 10/107,743, filed Mar. 26, 2002, entitled "Assistance Method and Apparatus," now U.S. Patent No. 6,801,899.

USPTO Transaction History of U.S. Appl. No. 10/951,502, filed Sep. 27, 2004, entitled "Methods and System to Connect Consumers to Information," now U.S. Patent No. 7,249,045.

USPTO Transaction History of U.S. Appl. No. 11/077,655, filed Mar. 10, 2005, entitled "Methods and Apparatuses for Pay-Per-Call Advertising in Mobile/Wireless Applications," now U.S. Patent No. 7,428,497.

USPTO Transaction History of U.S. Appl. No. 11/490,709, filed Jul. 21, 2006, entitled "Methods and Apparatuses for Pay-Per-Call Advertising in Mobile/Wireless Applications."

USPTO Transaction History of U.S. Appl. No. 11/738,374, filed Apr. 20, 2007, entitled "Method and Systems to Connect People to Services via Virtual Reality."
USPTO Transaction History of U.S. Appl. No. 11/772,525, filed Jul. 2, 2007, entitled "Methods and System to Connect Consumers to Information."
International Application No. PCT/US00/10730, International Search Report, Jan. 3, 2001.
International Application No. PCT/US00/06849, International Search Report, May 16, 2000.
EP Application No. 05745756.6, Examination Report, Jan. 28, 2010.
International Application No. PCT/US05/15645, Written Opinion and International Search Report, Feb. 5, 2007.

* cited by examiner

Compensation for Advice:

Information Flow:

Centralized Advice Sources

Diverse Advice Sources

Compensation for Advice:

Information Flow:

METHODS AND APPARATUSES FOR DELIVERY OF ADVICE TO MOBILE/WIRELESS DEVICES

The present patent application is related to U.S. patent application Ser. No. 11/077,655, filed Mar. 10, 2005 now U.S. Pat. No. 7,428,497 and entitled "Methods and Apparatuses for Pay-per-call Advertising in Mobile/Wireless Applications", which claimed the priority of Provisional U.S. Patent Application Ser. No. 60/653,708 filed Feb. 16, 2005.

The present patent application is related to U.S. patent application Ser. No. 09/782,925, filed Feb. 13, 2001 and now U.S. Pat. No. 6,549,889, U.S. patent application Ser. No. 09/782,984, filed Feb. 13, 2001 and now U.S. Pat. No. 6,546,372, and U.S. patent application Ser. No. 10/951,502, filed Sep. 27, 2004, which is a continuation application of U.S. patent application Ser. No. 10/107,743, filed Mar. 26, 2002 and now U.S. Pat. No. 6,801,899, which is continuation application of U.S. patent application Ser. No. 09/733,872, filed Dec. 8, 2000 and now U.S. Pat. No. 6,523,010, which is a continuation application of U.S. patent application Ser. No. 09/488,130, filed Jan. 20, 2000 and now U.S. Pat. No. 6,223,165.

TECHNOLOGY FIELD

At least some embodiments of the present invention relate to techniques for delivering information electronically, more particularly, for delivering advice to consumers from a diverse set of experts, matching consumer questions with experts, displaying available experts for consumer viewing and selection, providing for compensation from consumers to experts, and providing for the connection between consumer and experts, etc.

BACKGROUND

As more technology (e.g., video recorders, personal computers, Internet, TV web boxes, cell phones, etc.) enters peoples' lives, there is greater and greater demand for help in choosing devices and solutions and in setting them up and correcting problems. Even more generally, there is greater need for assistance in daily life, whether it is for medical, legal, family, or entertainment reasons.

At the same time that more information is required to conduct our lives, available effective sources of that information have not grown sufficiency in number or efficiency.

Companies selling products often have web pages or telephone support lines, but these are either too restricted in information, or the consumer must wait for long periods for live help.

To help with the routing of calls to available agents in a company, Cave (WO9813765) has devised a real-time system wherein a queuing manager routes calls to an agent who is free at the time. The system still involves automated answering systems which many consumers find frustrating, and it requires the hiring of not only agents but the queuing manager.

In the future, streaming audio and video capabilities on the web will make it possible for company agents to speak directly to consumers. However, this will be very costly to operate and the consumer will probably have to wait for long times to speak to one of the agents.

For general advice, the Internet is far too inefficient for many uses. Search engines return many hits, requiring the consumer to try many web sites and hope that the answer is available.

1-900 phone numbers (pay-per-call) are limited in scope and consumers hesitate to use them due to high per-minute rates, lack of trust in the billing, and generally perceived notions that the 900 numbers are for less-than-serious concerns such as astrology or sex chat. In addition, 900 services are small and narrowly focused, without the benefits of the Diverse Advice Sources arrangement, and they did not include matching and/or display technologies.

As shown in FIG. 1a, the fundamental problem with current advice technologies is that there are a large number of consumers and few agents to help them at each company; this is known as Centralized Advice Sources, and has the general shape of a funnel with too many questions going to too few agents. This leads to high cost (to pay agents and purchase systems), slow response time (long hold times on telephone), and lack of personal service (live agents). In addition, the agents often can only answer a limited range of questions regarding the companies' products. Thus, the participation and control of the consumer advice function by each company is fundamentally hurting the company by frustrating consumers and by requiring it to staff, manage, and pay for a vast and complex undertaking which is outside of its main expertise (making widgets, providing a narrow service, etc.).

Previous solutions have not adequately filled the need, particularly for immediate advice or connection between appropriate people.

The American Information Exchange (AMIX) was a central exchange that attempted to mediate between buyers and sellers of information. But the complexity and lack of immediacy, among other problems, limited its ability to efficiently solve the buyer's problem.

Walker (U.S. Pat. No. 5,862,223) envisioned a similarly complex exchange, often involving several lengthy steps where a user request is submitted; a search of experts, even beyond its members, is undertaken; a portion of the user request (question) is transmitted to the computer-selected expert, etc. until the request if fulfilled. Walker (col. 8, line 49; col. 24, line 67) allows the user himself to select the expert from a general list, but there is no provision for seeing which expert is available at that instant to talk, and there is no provision to make the process of connecting the expert and user quickly, say within 1 min or 10 seconds. In addition the user must submit a portion of his question (end user request).

In the complex process described by Walker, the expert and user can communicate in real-time (col. 9, line 1; col. 26, line 49), but only after the process of submitting the end user request to the expert.

In another embodiment of Walker (col. 28, line 66), the end user calls the central controller and eventually is put in touch with an expert for a real-time connection. No allowance is made for the central controller to make two separate calls (thus connecting the expert and user) after the user selects the expert.

In addition, there are no constraints in Walker on how fast the time-to-connect process needs to be to be useful. Timely information is more highly valued than delayed information.

Moreover, the detailed lists of experts and their characteristics (resumes, etc.) that are displayed in Walker (col. 25, line 35) are not suitable for a system that fills the need for rapid selection and connection between parties; as the number of experts grows, there will be simply too many pages of text to scroll through. There is needed a new display system where users can rapidly survey the available experts via information-rich graphics.

Walker does not take into account the use of experts as a workforce for customer support. No mention is made of product or service companies issuing certification for experts, and, in turn, those certifications listed or displayed explicitly by the central controller/server.

Telephone systems allow users to conduct real time two-way voice communication. Traditional land-line based telephone systems connect one telephone set to another through one or more switching centers, operated by one or more telephone companies, over a land-line based telephone network. Traditionally, a telephone connection is based on a circuit switched network.

Current telephone systems may also use a package switched network for a telephone connection. A package switched network is typical in a computer data environment. Recent developments in the field of Voice over IP (VoIP) allow the delivery of voice information using the Internet Protocol, in which voice information is packaged in a digital form in discrete packets rather than in the traditional circuit-committed protocols of the public switched telephone network (PSTN).

Cellular networks allow a cellular phone to connect to a nearby cellular base station through an air interface for wireless access to a telephone network. Recent developments in wireless telephone systems allow not only voice communications but also data communications. For example, cellular phones can now receive and send short messages through a Short Message Service (SMS). Web pages can now be retrieved through wireless cellular links and displayed on cellular phones. Wireless Application Protocol (WAP) has been developed to overcome the constraints of relatively slow and intermittent nature of wireless links to access information similar or identical to World Wide Web.

SUMMARY

Methods and apparatuses to connect consumers to diverse advice sources of experts are described here. In one embodiment, a method includes: providing a list of experts to a mobile device via a wireless media channel for presentation to a consumer; responsive to receiving from the mobile device a selection of one expert from the list of experts, initiating a telephonic connection between the expert and the consumer prior to the consumer submitting a question for advice. In one example, the list includes information to indicate whether one or more of the experts are individually available to telephonically communicate with the consumer at a time when the list is provided to the consumer. In one example, initiating the telephonic connection includes: initiating a first call to the consumer; initiating a second call to the expert; and joining the first and second calls to make the telephonic connection between the expert and the consumer.

DETAILED DESCRIPTION

Figure 1A:
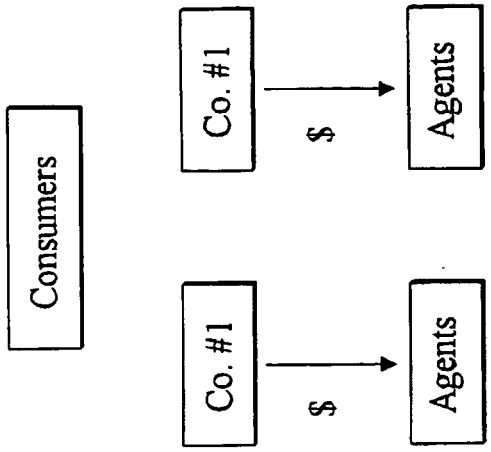
FIG. 1a shows the most common arrangement today of the advice business, known as Centralized Advice Sources.
Figure 1A:
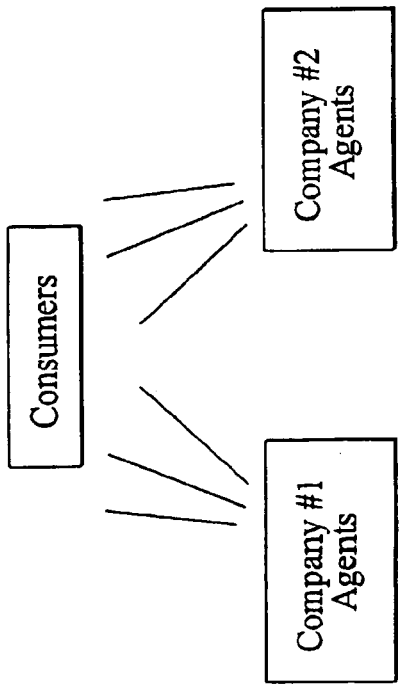

In the following description, for purposes of explanation, numerous specific details are set forth in order to provide a thorough understanding of the description. It will be apparent, however, to one skilled in the art that the invention can be practiced without these specific details. In other instances, structures and devices are shown in block diagram form in order to avoid obscuring the description.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, the term "advice" may refer to any needs of the consumer which can be provided for by an expert, including but not limited to conversation, entertainment, sounds or pictures of any kind, text, video, audio. This advice is not limited to that provided by agents regarding company products; it can include medical, legal, educational, travel, entertainment, religious, and other forms of advice. In addition, herein "advice" is meant broadly to include any type of information, comfort, or communication a consumer desires.

In one embodiment, the term "consumers" may refer to individuals, companies, organizations, governments, or devices which have one or more questions or needs for advice.

In one embodiment, the term "experts" may refer to individuals, companies, organizations, governments, or devices which are able to provide advice to consumers, provided that experts' initial means to contact consumers is via the server in the Advice Router. Experts' compensation, which may be zero, can come from either consumers directly or from the Advice Router. Collectively, experts represent a broader range of knowledge and experience than do agents which work for a single company. Much as the word "advice" is used broadly, "expert" is meant broadly since many types of information can be given by human beings.

In one embodiment, the term "agents" may refer to individuals, companies, organizations, governments, or devices who, as part of their relationship/employment at that institution, answers questions when connected to his institution's telephone or server, provided that the agent is paid by the institution for that function. The advice provided for by agents is generally restricted to that regarding products offered by their respective company.

In one embodiment, the term "server" may refer to any device, network or software which connects consumers and experts.

In one embodiment, the term "query" may refer to an action initiated by a consumer which includes keywords or other means to summarize their question or need for advice.

In one embodiment, the term "expert characteristics" may refer to information used for matching with consumers queries. Including, but not limited to one or more of the following: a code name which does not include his real name; keywords of expertise; number of years experience in each area of expertise; degrees earned; number of years of school after completion of high school or college; companies worked for or schools/training programs attended in the past or present; age; language; neighborhood, city, state, and/or country of residence; quality score as judged by previous consumer interactions; compensation rate for consumer advice; and whether the expert is available at the actual moment of consumers query or within 1, 2, 5, 10, 15, 30, 60 minutes.

In one embodiment, the term "matching" may refer to a process for scoring and putting in an order of relevance a list or selected list of experts who are likely to be able to answer a consumer's query. A matching process can involve any method of assignment of numbers to the number of keyword matches or matches between ranges of characteristics desired by the consumer with the actual expert characteristics.

In one embodiment, the term "logged in", or "on-line", may refer to detectable means of communication between server and expert, including but not limited to telephone, Internet telephony, email, audio, and/or video.

In one embodiment, the term "means to contact" may refer to any method, information, or technology used to bring together the consumer with one or more experts, including but not limited to telephone, Internet telephony, email, audio, and/or video. Means to contact includes telephone numbers (including toll-free and pay-per-call numbers), email addresses, Internet web pages or sites, video-conferencing details. More preferably, the means of contact includes telephone, Internet telephony, audio, and/or video, and even more preferably Internet telephony, audio and/or video, and even more preferably video. The technology to be used for any of the above includes TVs, TVs with set-top web browsers, PCs, telephones, and satellite connections.

In one embodiment, the term "time-to-connect" may refer to the period of time between the transmission of the means of contact and the actual connection between expert and consumer. In the case where the consumer selects an expert, the time-to-connect is the period of time beginning from the consumer's last action (e.g., clicking on the symbol for an expert or his telephone number) and ending when the actual connection is made. In the case where the server makes both connections, the time-to-connect is the period of time beginning when the server indicates to the consumer that it is beginning to contact the expert and ending when the actual connection is made.

In one embodiment of the present application, "advertisement" may refer to various different forms of presentations to attract attention or patronage. An advertisement may be simply a listing of identity and contact information (e.g., in a web page, a print media, a telephonic listing service, etc.), or a passage including one or more statements about business offering, etc., or a banner with graphical content and/or animation embedded in a web page, or a voice message presented in a voice channel (e.g., radio broadcasting, a voice portal with Interactive Voice Response (IVR), which may accept user input through voice recognition or through keypad input generated Dual Tone Multi-Frequency (DTMF) signals), or others.

Diverse Advice Sources

Figure 1B:
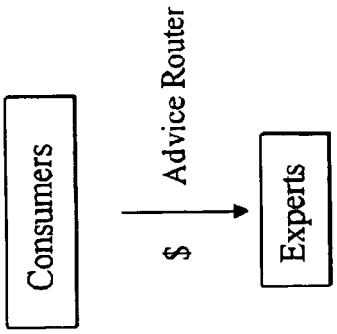
FIG. 1b shows a fundamentally new advice technology structure, Diverse Advice Sources, according to one embodiment of the present invention.
Figure 1B:
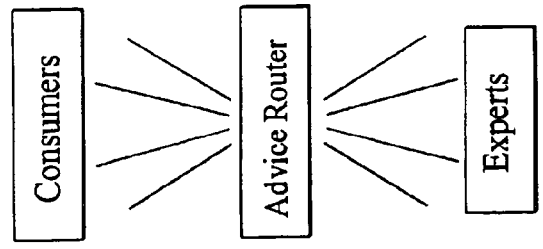

One embodiment of the invention includes a fundamentally new advice technology structure, Diverse Advice Sources, wherein the actual companies selling products are not involved or only peripherally involved. Diverse Advice Sources more evenly equalizes the number of questions in the world at a given point in time with the number of experts who are likely to be able to answer their questions. As shown in FIG. 1b, this technology is in an hourglass shape where a large number of experts is available rather than the small number of agents at each company. In the middle is a new form of information company, the Advice Router, which rapidly facilitates the matching of and connection between consumers and experts.

The sheer number of experts available in Diverse Advice Sources solves the arithmetic (funnel) problem of Centralized Advice Sources, leading to the two most important benefits: fast response and the routine availability of live experts. In addition the diversity of sources raises the likelihood that the consumer will get more holistic advice, not limited to the tools available from any one company.

In another embodiment, a method of (or apparatus for) facilitating the delivery of advice to consumers, includes: providing a server unit with the ability to store the names or identification of two or more experts, the experts coded by one or more expert characteristics, the server having the ability to detect which experts are online; the server having the ability to display at least one of the expert characteristics with information-rich graphics or symbols; the server having the ability to respond to a consumer's selection of expert by either sending the consumer a means to contact expert or by connecting the consumer and expert for real-time communication; wherein the time-to-connect between consumer and expert is 30 minutes or less.

In another embodiment, a method of (or apparatus for) facilitating the delivery of advice to consumers, includes: providing a server unit with the ability to store the names or identification of two or more experts, the experts coded by one or more expert characteristics, the server having the ability to detect which experts are online; the server unit having the ability to receive one or more keywords from a consumer; the server unit having the ability to match those keywords to one or more experts and send the consumer a means to contact; where the time-to-connect between consumer and expert is 30 minutes or less.

Further aspects and examples of various embodiments of the present invention are illustrated and described below.

Certification

In the transition from central to diverse advice sources, companies will find that it is economical to broaden its customer support workforce to non-employees. While these non-employees may not have as detailed or as frequent training, they can answer many of the questions consumers have. Thus a company can offer simple tests and, optionally, transmit the results of those tests to the server, which maintains an up-to-date status of each expert. Alternatively, the company can simply give the certification to the expert who transmits the results to the server.

Certification tests can take many forms, including but not limited to web-based questionnaires, phone, Internet, or face-to-face interviews, live video connections, etc. Optionally, a company can use authentication procedures (e.g., fingerprint, voiceprint, "cookies" on the expert's computer, passwords, etc.) to ensure the expert's identity. Optionally, the test and results can be cryptographically transmitted between the company and expert; or between the company and server.

Certification can also come from organizations or schools or governments.

Matching

One embodiment provides for a matching system or relevance scoring method which finds the best expert to answer a consumer's question. This can involve any method of assignment of numbers to the number of keyword matches or matches between ranges of characteristics desired by the consumer with the actual expert characteristics. This technology is known for search engines for finding matches between a consumer's keywords and web pages as well as those for finding matches for merchandise. However, a system and method does not currently exist that allows one to match a wide array of features, including, but not limited to, two or more of the following expert characteristics: a code name which does not include his real name; keywords of expertise; number of years experience in each area of expertise; degrees earned; number of years of school after completion of high school or college; companies worked for or schools/training programs attended in the past or present; age; language; neighborhood, city, state, and/or country of residence; quality score as judged by previous consumer interactions; compensation rate for consumer advice; and whether the expert is available at the actual moment of consumers query or within 1, 2, 5, 10, 15, 30, 60 minutes.

It is preferred that the number of categories in the list of expert characteristics used for matching be at least four, such as code name, keywords, compensation rate, and time availability. More preferably, the number of categories should be at least six. Even more preferably, the number of categories should be at least eight. Most preferred, the number of categories should be at least ten.

Another embodiment provides for a system for and method of displaying selected experts to the consumer. This includes, at a minimum, conveying, through means that include but are not limited to telephone, Internet telephony, email, audio, and/or video, a way for the consumer to contact the expert (the means of contact). It is more preferred for that conveyance to be performed by Internet telephony, email, audio, and/or video. It is most preferred for that conveyance to be performed by audio, and/or video.

The number of experts presented to the consumer can be at least one. It is more preferred that the number of experts presented to the consumer is at least two. It is even more preferred that the number of experts presented to the consumer is at least five. It is even more preferred that the number of experts presented to the consumer is at least ten. It is even more preferred that the number of experts presented to the consumer is at least 20. It is most preferred that the number of experts presented to the consumer is over 100.

One embodiment provides for a system for and method of protecting the privacy and identity of both the expert and the consumer. If the expert prefers, his actual name, address and other information will be withheld from the consumer. Also, individual entries in the expert characteristics list can be shielded from view by the consumer. The consumer likewise can be protected. While privacy has been provided for in commercial/advertising technologies (see Goldhaber, U.S. Pat. No. 5,855,008), the shielding but still utilizing detailed expert characteristic lists has not been provided for.

Display

In addition to the mere conveyance of the means of contact, it is more preferred for the consumer to be presented with a visual display of available experts. Systems and methods have been used for displaying game-playing individuals, with information related to availability for a game now, skill level, and code name. No such system or method exists for displaying expert characteristics.

Display methods include but are not limited to information-rich graphics such as objects with varying color or density, bar graphs, line graphs, 3-D graphs, icons, pictures, photographs, video. All of the above can include animation or motion to attract attention. Words and numbers can be added on or near any of the above to give further expert characteristics. Any of the above can be addressable by mouse/cursor location so that the consumer can easily select which expert to choose or which set of experts to zoom in on and view more closely. Optionally, zoom (magnification) and/or rotation functions can also be used. The zoom function can allow new and more detailed expert characteristics to appear with each increase in magnification. Similarly rotations of objects can reveal more detailed expert characteristics.

Useful expert characteristics that can be displayed visually include, but are not limited to: the expert's quality (rating) score, whether the expert is online now, or how long until he will be; whether the expert has a separate phone line, and whether it is busy or not.

A legend can optionally be provided when abstract symbols or colors are used so that consumers can tell what each symbol or color means.

In another embodiment, experts can select their own symbol, pictures, logos, etc. to advertise themselves. These include all of the above options. Optionally, they can use online avatars to represent themselves, with the additional option of the voice and facial expression of the expert transmitted to the consumer via this avatar.

In another embodiment, a special symbol/notation is displayed next to or as part of an experts symbol if he has been certified by selected companies or organizations. The symbol/notation can optionally expire, disappear, or change its characteristics (color, etc.) after a certain length of time so that the expert is forced to take tests to maintain certification.

In another embodiment, the display is a map either of geography, system or building architecture or any type of display where experts are, at that time, located or qualified in. The map and expert symbols on it are continually updated to see who is online and/or their exact or general location. The size of the symbol used for each expert is adjusted as the number of experts online increases so each can be displayed. Optionally the zoom function allows better viewing of crowded regions of the map.

This display method can be useful in cases where a consumer only wants information from someone at a particular location, e.g., to determine weather, sport conditions (ski, surf, etc), traffic, delivery/pickup truck availability, nature (animal sightings), entertainment (club-hopping), state or city laws, or any kind of location-dependent information.

Other types of non-geographical maps or diagrams can also be used, including but not limited to software architecture, flow charts, graphs, etc. Here the location of the expert's symbol is determined by their expertise in a particular subject within that map.

In some cases, if the expert is qualified in more than one area, two or more of his symbols may appear in a given map or diagram.

Graphical displays (line or scatter plots, etc) can be used by the consumer to weigh different features of the experts before making a selection. The consumer can be given a choice of 2- or 3-dimensional, and what the axis of the graph represents: quality score, compensation rate, distance from the consumer, etc. The symbols for the available experts in a particular subject area are placed in their appropriate position of the graph and the consumer can see, for example a scattergram and pick a well-rated expert who is not too expensive.

It is more preferred that the display method graphically show at least the following two items: relevance score or order of preference of experts on the one hand, and the time availability of the expert on the other. The latter refers to whether the expert is available at the actual moment of consumers query or within 1, 2, 5, 10, 15, 30, 60 minutes. It is even more preferred that the display method graphically show at least the following three items: relevance score or order of preference of expert, the time availability of the expert, and the compensation rate for consumer advice with that expert. It is even more preferred that the display method graphically show at least the following four items: relevance score or order of preference of expert, the time availability of the expert, the compensation rate for consumer advice with that expert and the quality score as judged by previous consumer interactions. It is most preferred that the display method graphically show at least the following five items: relevance score or order of preference of expert, the time availability of the expert, the compensation rate for consumer advice with that expert, the quality score as judged by previous consumer interactions, and one item selected from the following list: number of years experience in each area of expertise; degrees earned; number of years of school after completion of high school or college; companies worked for or schools/training programs attended in the past or present; age; language; neighborhood, city, state, and/or country of residence.

Compensation

Diverse Advice Sources fundamentally changes the economics of the consumer advice business. Diverse Advice Sources replaces the awkward arrangement in Centralized Advice Sources wherein individual companies are expected to pay for consumer advice (by paying their hired agents) when it is the consumer who is benefiting from the advice. Of course consumers had in the past expected companies to pay for this advice, to encourage the consumer to use their product and not products from competing companies. The companies respond by establishing limited consumer advice groups which are highly inefficient and costly to the company. In Diverse Advice Sources, the consumer pays for the advice information packet directly, to either or both of the expert and the Advice Router.

One embodiment includes an alternative case where the consumer does not directly pay either the expert or the Advice Router. In this special case, general advertisements are used to fund the Advice Router, and the Advice Router either compensates the expert for his time, or the expert receives no direct compensation and instead gains some other value (e.g., advertising).

Unique payment systems and methods used by the Advice Router include but are not limited to the following:

a) credit card or (cyber-money) accounts for one or both of the consumer and expert; proper deductions and credits are made to each account after each transaction.

b) the means of contact can include a 900 number (or similar per-per-call/pay-per-view technology for the Internet); in this case, the consumer simply dials the 900 number given by and controlled or contracted for by the Advice Router, and the expert is paid according to well-known 900 number technology. This 900 number technology has been used in the past to provide advice from individual groups, but these activities did not include matching and/or display technologies, nor did they have the benefits of the Diverse Advice Sources arrangement.

c) other phone or media accounts.

Various payment schemes can be optimized to meet consumer and expert expectations. For example, rather that a flat per-hour, per-minute, or per-session rate, a number of schemes can be used to compensate for the consumer ensuring that the expert is adequate (for example, the first two minutes free), etc.

In all of these cases, the Advice Router can receive a fee for conveying the means of contact, and/or the connection.

Also, the Advice Router can pay or rebate a portion of the consumer charge if the consumer take some additional action, such as rating the quality of the expert, etc.

Connection

One embodiment provides for a system and method whereby the server used by the Advice Router can be used for providing for or aiding rapid connections and monitoring of interactions between consumers and experts.

Regarding the connection, it is preferred that the server provide for or facilitate a connection within 30 minutes after the means of contact has been conveyed to the consumer. It is more preferred that the time-to-connect is 10 minutes or less. It is even more preferred that the time-to-connect is 5 minutes or less. It is even more preferred that the time-to-connect is 2 minutes or less. It is even more preferred that the time-to-connect is 1 minute or less. It is even more preferred that the time-to-connect is 30 seconds or less. It is even more preferred that the time-to-connect is 20 seconds or less. It is most preferred that the time-to-connect is 10 seconds or less.

The connection can include any method or technology used to bring together the consumer with one or more experts, including but not limited to telephone, Internet telephony, email, audio, and/or video. More preferably, the connection involves telephone, Internet telephony, audio, and/or video, and even more preferably Internet telephony, audio and/or video, and even more preferably video. The technology to be used for any of the above includes TVs, TVs with set-top web browsers, PCs, telephones, and satellite connections.

In the case where the consumer selects an expert on the Internet, the server can connect both using a two-step procedure wherein two separate and independent transmissions (e.g., telephone calls) are placed and then the two transmissions are joined together. This allows the server to store the expert addresses/phone numbers anonymously and control the connection.

The server should be able to monitor the interactions to provide for quality control and/or exact payment.

Example

Two experts, Joe and Bill, connect to the Advice Router and fill out forms describing their expertise. Joe is expert in Microsoft's Word and Powerpoint programs, and Bill is expert in the Word and Excel programs. The server detects that they are both logged on. Later that evening, Bill is busy with a consumer for a period he estimates will be 15 more minutes. Joe is free. At that moment, David, a consumer, logs on and fills out a keyword query list that best suits his question: how to turn off the automatic spellchecker in Microsoft Word. He also gives his VISA credit card number via a secure link. A second after he finishes his entry, a display on his PC shows two color-coded boxes coinciding with the current list of available experts, Joe and Bill (only their code names are used, however). The relevance score for both is 1.0 (optimal) since both are experts in Microsoft Word. Both experts also charge the same rate, $1.00 per minute. However, a small box in Joe's area is clearly green and easy to read—this box corresponds to the fact that Joe is available at this instant to speak to David. (David does not select Bill since the red color in his box corresponds to a 15 min. wait or more.) David clicks an icon in Joe's box and a second or two later, a streaming real-time video of Joe appears on David's PC, and if David's PC is so enabled, Joe sees David in his PC. They spend five minutes solving David's problem and log out. Prior to logging out, however, David receives a $0.50 rebate on the cost of the connection by rating the quality of Joe's help, from 0 for "awful" to 10 for "great". The cost of David's call is $5.00 minus $0.50 or $4.50; in his case, this is added to his monthly $50-$100 phone/Internet bill.

For maintaining the site, the Advice Router deducts $1.00 from the net $4.50 received and remits $3.50 to Joe. If David had not elected to receive the $0.50 rebate, the Advice Router would have made $1.50 on the call.

For most of its experts, the Advice Router takes out 30% before paying the experts.

Mobile/Wireless Examples

Figure 2:
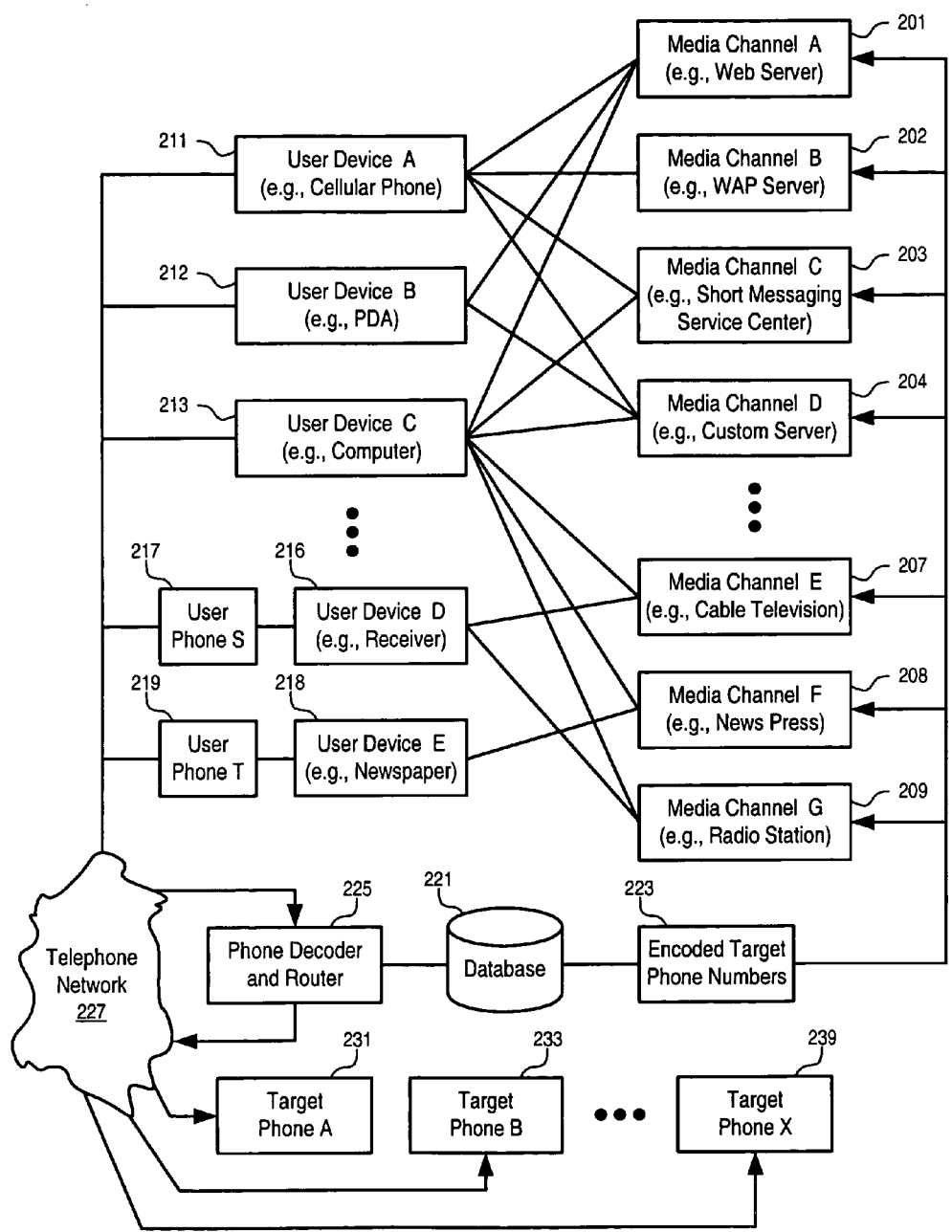
FIG. 2 shows a diagram of a system to make and track phone connections according to one embodiment of the present invention.

FIG. 2 shows a diagram of a system to make and track phone connections according to one embodiment of the present invention.

In FIG. 2, a database (221) may contain the phone numbers of target phone A (231), target phone B (233), . . . , target phone X (239), etc., such as the phones of the experts of diverse advice sources (or advertisers). Typically, the target phones belong to the institutions, businesses, individuals, etc, which seek for publicity through various media channels, such as media channel A (201) (e.g., web server), media channel B (202) (e.g., WAP server), media channel C (203) (e.g., short messaging service center), media channel D (204) (e.g., custom server), media channel E (207) (e.g., cable television), media channel F (208) (e.g., news press), media channel G (209) (e.g., radio station), etc.

In one embodiment of the present invention, the phone numbers of the target phones are not directly publicized over the media channels. Instead, encoded target phone numbers (223) are used. Using the encoded target phone numbers (223), a user cannot reach target phones directly. The encoded target phone numbers (223) allow the association of additional information with the target phone numbers, such as the media channels used, special promotions, etc.

The encoded target phone numbers can be delivered with content information (e.g., web page, WAP page, short message, television programs, news articles, etc.) to user devices, such as user device A (211) (e.g., cellular phone), user device B (212) (e.g., personal digital assistant (PDA)), user device C (213) (e.g., computer), user device D (216) (e.g., receiver), user device E (218) (e.g., newspaper).

In one embodiment, the user devices are mobile devices, such as PDA, cellular phone, etc. The user devices obtain content information, including advertisements (e.g., listings of experts), through wireless communication connections, such as cellular communication links, wireless access points for wireless local area network, etc.

In one embodiment, a user device (e.g., a cellular phone, a computer, a PDA) can receive content information from multiple types of media channels (e.g., a web server, a WAP server, a SMSC, etc.).

In one embodiment, a user device is capable to dial a phone call (e.g., automatically according to the encoded phone number embedded in the content information when a user selects the number). Alternatively, a user may manually dial a phone call using a separate phone, such as user phone S (217) or user phone T (219).

In one embodiment, dialing at least a portion of an encoded target phone number connects the phone call to a phone decoder and router (225) first. According to the encoded target phone number dialed, the phone decoder and router (225) determines the corresponding target phone number using the database (221) and connects the phone call to the corresponding target phone (e.g., one of target phones 231-239) through the telephone network (227).

Note the telephone network (227) may be circuit switched, package switched, or partially circuit switched and partially package switched. For example, the telephone network may partially use the Internet to carry the phone call (e.g., through VoIP). For example, the connection between the user phone/device and the phone decoder and router (225) may be carried using VoIP; and the connection between the phone decoder and router (225) may be carried using a land-line based, circuit switched telephone network.

In one embodiment of the present invention, the information associated with the encoded target phone number, such as the media channel used to provide the encoded target phone number to the users, is also decoded/retrieved using the database (221). Thus, the information associated with the encoded target phone number can be tracked/stored.

In one embodiment, the phone decoder and router (225) also determines the phone number of the user through Automatic Number Identification (ANI). ANI is a phone system feature that provides the billing number of the person making the phone call.

The information about the caller, target phone number, the media channel used for delivering the contact information to the user can be used to bill the caller and/or the target phone number, and provide credit/compensation for the corresponding media channel.

For example, the advertisements for target phone numbers can be paid for on a pay per call basis. Monitoring and tracking the calls can be used for billing the advertisers (e.g., the experts, or billing the customers, such as the consumers). Alternatively, the users may be seeking the contact information on a pay per call basis. Monitoring and tracking the calls can be used for billing the users.

In one embodiment of the present invention, the additional information associated with the encoded target phone number is used to provide credit/compensation to the operators of the corresponding media channels that are responsible for leading the users to the phone calls to the target phones. The system can further track the time and duration of the phone calls and other information, such as conditional promotions, electronic coupons, etc.

The information about the media channels that are responsible for leading the users to the phone calls to the target phones can also be useful for the advertisers. The advertisers may wish to know which media channel is more effective in reaching users. For example, using the statistic information about the media channels which successfully bring in phone calls, the advertisers may fine tune advertisement strategies. Further, different media channels may charge differently for the advertisements; and the advertisers may bid differently on different media channels for their advertisements.

In one embodiment of the present invention, an encoded target phone number has the same number of digits as a standard phone number (e.g., a typical telephone number assigned by a telephone company). Thus, dialing the encoded target phone number is as easy as dialing the target phone number; and dialing the target phone number reaches the phone decoder and router (225). In such an arrangement, a large number of encoded phone numbers are generally required to differentiate the different target phones and different media channels.

In one embodiment of the present invention, an encoded target phone number has more digits than a standard phone number. A first portion of the encoded target phone number has the same number of digits as a standard phone number to reach the phone decoder and router (225) through the telephone network (227); and a second portion of the encoded target phone number is to be decoded by the phone decoder and router (225). For example, the Dual Tone Multi-Frequency (DTMF) decoder can be installed in the phone decoder and router (225) to detect the second portion of the encoded target phone number dialed at the user phone. The detected phone number can then be used to recover the target phone number.

When an encoded target phone number has more digits than a standard phone number, the additional digits can be implemented as a telephone extension, or as an IVR system.

In one embodiment of the present invention, a single telephone number is used to reach the phone decoder and router (225) for different target phone numbers; and the portion of the encoded target phone number that is used to reach the phone decoder and router (225) is not used in determining the information associated with the encoded target phone number.

Alternatively, multiple telephone numbers can be used to reach the phone decoder and router (225); and the entire encoded target phone number can be used to determine the information associated with the encoded target phone number.

In one embodiment of the present invention, the encoded target phone numbers can have different numbers of digits. The advertisers may be arranged to bid for shorter encoded target phone numbers.

In one embodiment of the present invention, the encoded target phone numbers are assigned only when needed for use in a media channel.

In one embodiment, a look-up table approach is used to encode the information. For example, the database (221) keeps track of the information about the media channel and the target phone number (and other information, if any) for the encoded target phone number so that the encoded target phone number can be used as a key to retrieve the corresponding information. Thus, it is not necessary to have a predetermined structure to encode the information about the media channels and the target phone number.

Alternatively, algorithms can be used to generate and encode target phone number and associated information. For example, a predetermined algorithm may be used to encode different information in the target phone number. For example, the target phone number may include a number of field separated by "*" or "#". Each of the field can be decoded separately (e.g., from a separate look up table or a mapping algorithm) to determine the target phone number, identity of the media channel, etc.

For example, a set of parameters can be mapped from a string of characters to a string of numerical digits as a part of the encoded target phone number; and the string of numbers can be mapped back into the string of characters at the phone decoder and router (225). When such a mapping scheme is used, a look up table is not necessary. For example, an encoded target phone number may include a first portion that is the phone number of the phone decoder and router (225), a second portion that is the target phone number appended with a number mapped from an identifier of the media channel. To prevent the user from dialing the target phone number directly, an encryption/scrambling scheme can be used to encode the second portion, which is decoded at the phone decoder and router (225).

In one embodiment of the present invention, the phone decoder and router (225) determines the target phone number from the encoded target phone number dialed by the user and then dials the target phone number for the user and joins the phone calls so that the user can talk to the target phone.

In one embodiment of the present invention, users dial the encoded target phone numbers manually. A user can dial the encoded target phone number regardless the user device used and the media channel used.

Alternatively, in one embodiment, user devices can automatically dial the encoded target phone numbers. For example, a cellular phone, a computer or a PDA can dial a phone number using a Dual Tone Multi-Frequency (DTMF) generator. In one embodiment of the present invention, the encoded target phone numbers are presented in the content information in a format such that when the user selects the phone number the user device (e.g., a cellular phone or a computer) dials the encoded target phone number for the user. The user selection may be in the form of an keyboard/keypad input, a touch pad input, a track ball input, a mouse input, a voice command, etc.

In one embodiment, the user device initiates the phone call through a VoIP system when the user selects the encoded target phone number.

In one embodiment of the present invention, the user device dials the phone number for the user without the user manually pressing the sequence of the encoded target phone numbers. This greatly simplifies the process of make the phone call. Since a user device can dial a long sequence of number easily, a large number of digits can be used to encode the information without presenting any difficulties for the users.

In one embodiment of the present invention, the encoded target phone numbers are formatted so that the user device dials a first portion of the encoded target phone numbers to access the phone decoder and router (225), pauses for a short period of time for the phone decoder and router (225) to prepare for receiving the second portion of the encoded target phone numbers, and then dials the second portion of the encoded target phone numbers. Thus, the user device provides a user-friendly way of dialing the encoded target phone numbers; and, making the phone call can be as easy as making a "click" to access a web page.

In FIG. 2, the user device initiates the phone call. Alternatively, a phone router may be used to initiate phone calls both to the user device (or a separate user phone) and the target phone and then join the phone calls to connect the user to the target phone. For example, when the user selects the encoded target phone number, the selection of the target phone number is transmitted to the phone router with the user phone number.

The user phone number can be automatically determined through ANI, or through a user preference setting, or through an entry submitted with the selection of the encoded target phone number.

In one embodiment, the selection of the encoded target phone number is transmitted to the corresponding media channel, which forwards the request for making the phone call to a server (e.g., a web server) connected to the phone router. Alternatively, the content information can be formatted so that the selection is sent directly to the server that is connected to the phone router.

When the router starts the phone calls, the encoded target phone number can also include alphabetic characters (and/or other characters). The server and/or the phone router can decode the encoded target phone number to recover/retrieve the target phone number and other associated information, such as the identity of the media channel that is creditable for providing the encoded target phone number to user. In one embodiment, the encoded target phone number is an indication of the identity of the selected expert; and a server looks up the target phone number according to the indication of the identity of the selected expert.

Figure 3:
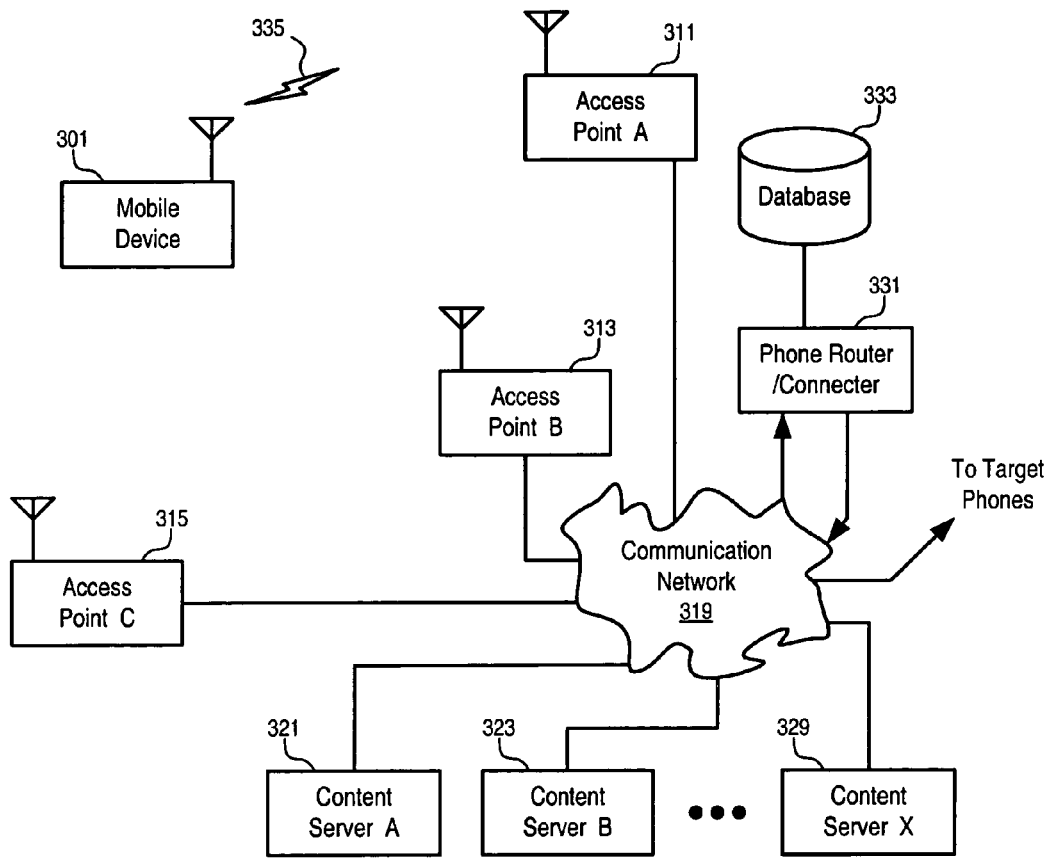
FIG. 3 shows a diagram of a system to make and track phone connections from a mobile device according to one embodiment of the present invention.

FIG. 3 shows a diagram of a system to make and track phone connections from a mobile device according to one embodiment of the present invention.

In FIG. 3, a mobile device (301) accesses content server A (321), content server B (323), content server X (329), etc., through a wireless link (335) to a access point, such as access point A (311), access point B (313), and access point C (315). In general, the access points may be of different types. For example, the access point may be a cellular base station, an access point for wireless local area network (e.g., a WiFi access point), an access point for wireless personal area network (e.g., a Bluetooth access point), etc. The access point connects the mobile device to the content servers through a communication network (319), which may include the Internet, an intranet, a local area network, a public switched telephone network (PSTN), private communication networks, etc.

In one embodiment, the content servers provide encoded target phone numbers, which when dialed connect the mobile device to the phone router/connecter (331) which used the database (333) to decode the encoded information and/or store the information about the phone call in the database (333). The router/connecter (331) further connects the mobile device to the target phones. Alternatively, the router/connecter (331) may dial phone calls to the mobile device and the corresponding target phone and then join the phone calls to connect the mobile device and the target phone.

In one embodiment of the present invention, location-dependent content information is delivered from a content server to the mobile device. The user may enter the location manually (e.g., through text input or voice input which is processed through a speech recognition system). The content information may be presented on a display screen or using an audio channel through a text to speech system.

Alternatively, the location of the mobile device may be determined automatically, which is then used to determine the location-dependent content information. For example, the location of the mobile device may be determined through a Global Positioning System (GPS) receiver that is connected to, or built within, the mobile device.

A location of a cellular phone can also be determined using a method known as Time Difference of Arrival (TDOA) in which the reception times of a cellular signal from a mobile station are measured at several base stations to determine the position of the cellular phone. Alternative, a method known as Advanced Forward Link Trilateration (AFLT), or Enhanced Observed Time Difference (EOTD), can be used, which measures the reception times of cellular signals from several base stations to the cellular phone. Alternatively, the cellular site in which the mobile device can communicate to a based station can be used to determine a rough position of the cellular phone. In general, any method used by a cellular phone provider to get location information (e.g., for emergency service) can be used.

An access point for a wireless local area network or a wireless personal area network typically has a small coverage area. Based on the location of the access point, location information (e.g., the city, or more precise location information) can be obtained.

Further, ANI can also be used to determine the location information. Although the location information determined from ANI may not represent a correct position of a mobile device, content information about the location determined from ANI may still be of interest to the user.

In one embodiment of the present invention, when the user performs a search for information which may be location dependent, the location automatically determined for the mobile device is used with the search request. For example, when the user search for "hotels" without specifying a location using an SMS-based search, the city in which the mobile device is located is determined; and a pay-per-call list of hotels in the city is sent via SMS to the mobile device.

In one example, the user may search for "dentists" in a custom client application; and a custom server application provides a pay-per-call list of "dentists" close to the current position of the mobile device.

In one example, the user may search in a web page or a WAP page for a particular subject. The return results include one or more pay-per-call advertisements to be presented in a browser running in the mobile device.

In one embodiment of the present invention, certain content information is automatically channeled into the mobile device when the mobile device enters into a wireless access zone. For example, when the mobile device enters into a commercial district, pay-per-call lists of various nearby points of interest, such as hotels, movie theaters, restaurants, etc., can be automatically presented on the mobile device, according to user preferences.

In one embodiment of the present invention, a user may search for particular types of experts, businesses, institutions, persons, etc. When the user is interested in calling one selected entity (e.g., an expert, a doctor, a restaurant), the mobile device can automatically dial the encoded phone number of the entity without the user manually dial the number; and the phone router/connecter decodes the information and connects the mobile device to the phone of the selected entity. Alternatively, the phone number of the mobile device may be determined (e.g., through ANI, or user input, or user preference setting); and the phone connector connects phone calls to both the mobile device and the phone of the selected entity to connect the user to the selected entity. In such a process, the identity of the mobile device may be kept anonymous from the selected entity; and the identity of the selected entity may also be kept anonymous from the user of the mobile device.

Figure 4:
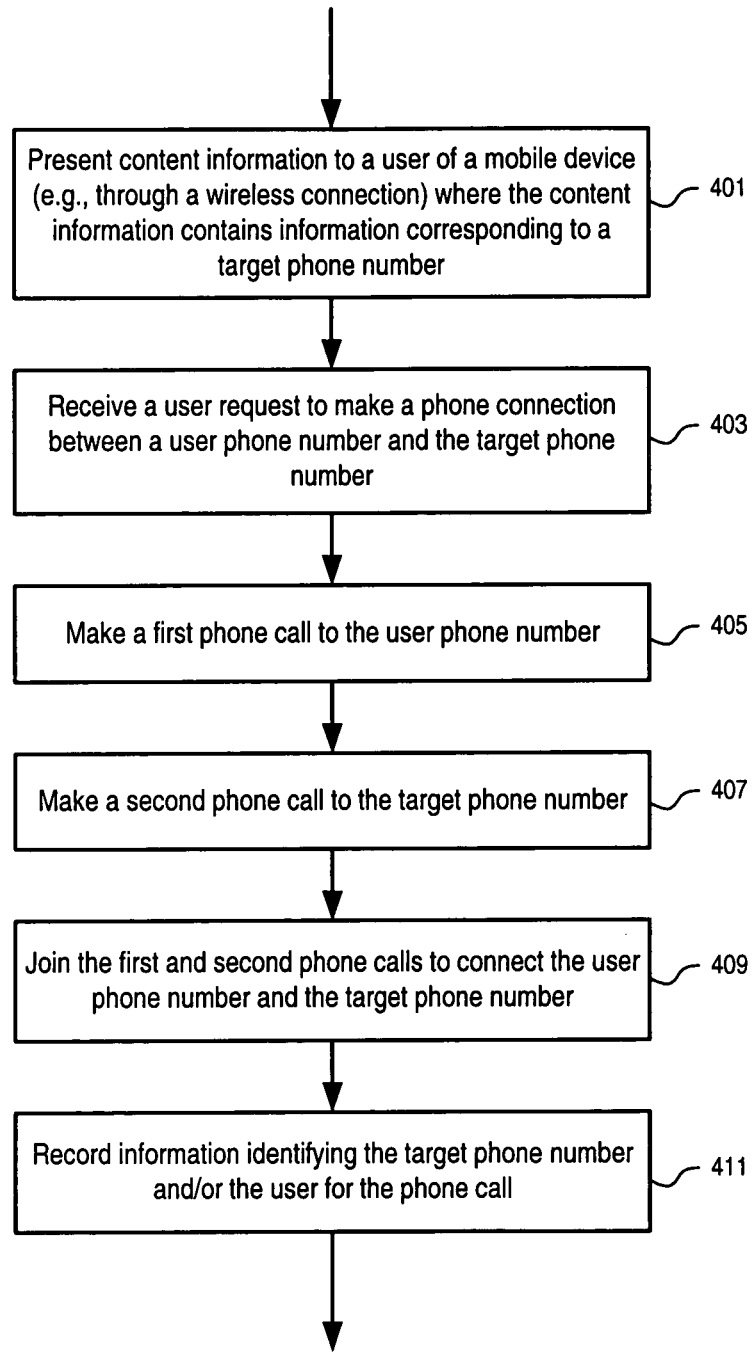
FIGS. 4-5 show flow diagrams of making and tracking phone connections according to embodiments of the present invention.
Figure 5:
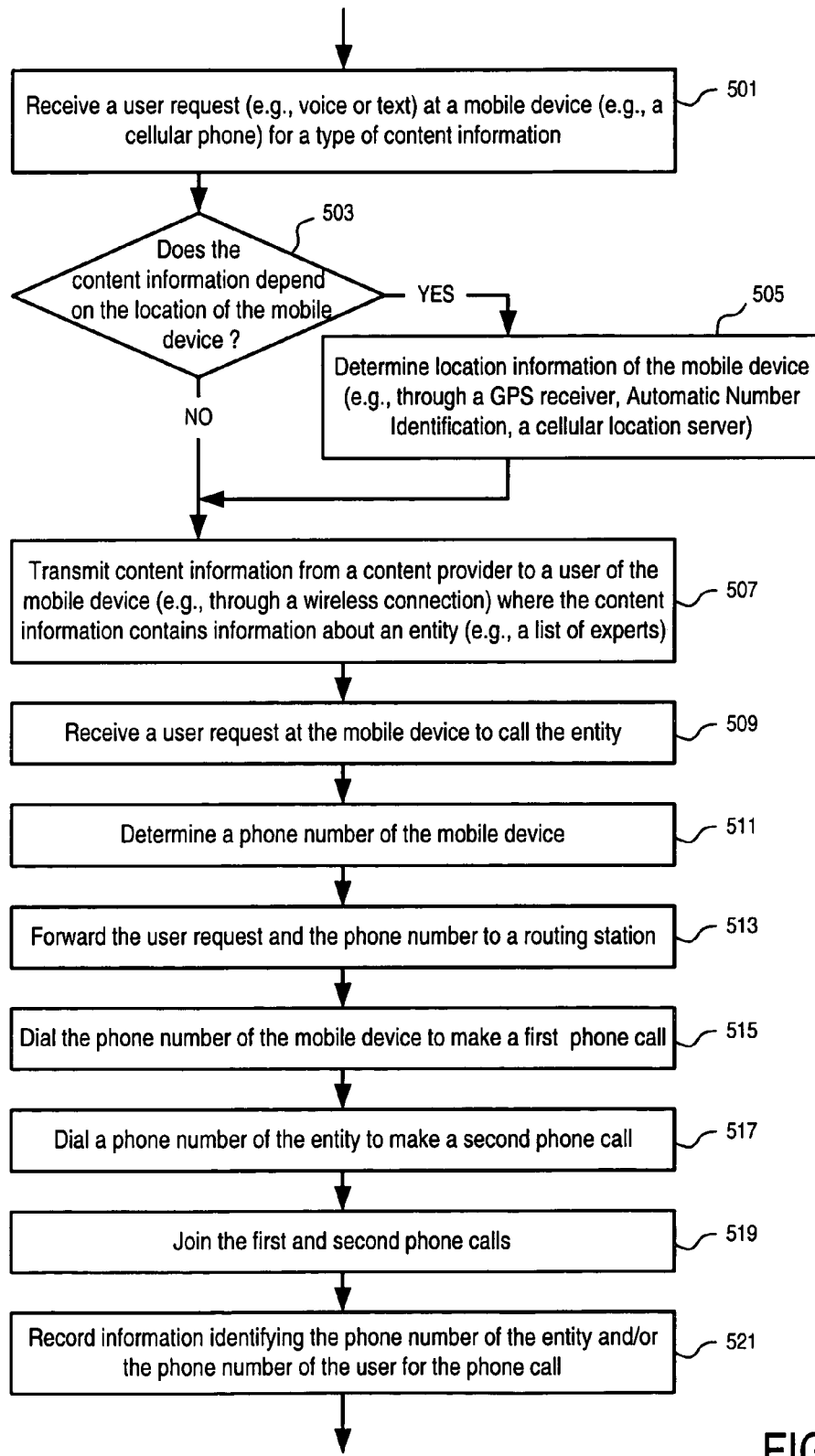

FIGS. 4-5 show flow diagrams of making and tracking phone connections according to embodiments of the present invention.

In FIG. 4, operation 401 presents content information to a user of a mobile device (e.g., through a wireless connection) where the content information contains information corresponding to a target phone number. In one embodiment, the content information includes a list of experts of diverse advice sources. The list may include information about availability of the individual experts to telephonically communicate with the user at the time the list is provided to the user. The list may further include information such as certification, compensation rate, quality score, avatar representation of the experts, etc. In one embodiment, the list is provided in response to the user requests a search of experts based on expert characteristics. In one embodiment, the list is provided in response to a user selection of category. In one embodiment, the list is provided in response to a location determination of the mobile device (e.g., as the mobile device entering a commercial district).

After operation 403 receives a user request to make a phone connection between a user phone number and the target phone number, operation 405 makes a first phone call to the user phone number; and operation 407 makes a second phone call to the target phone number. Operation 409 joins the first and second phone calls to connect the user phone number and the target phone number. For example, the user may make the request through selecting an expert from the list of experts (e.g., clicking on a representation of the expert displayed on a screen, providing a voice command to select the expert, etc.)

Operation 411 records information identifying the target phone number and/or the user for the phone call. The recorded information can be used to bill the user and/or the target phone number.

In one embodiment, after the telephonic communication between the expert and the consumer, the consumer is prompted to provide a quality score for the expert. The system determines a quality score for the expert for display with lists of experts based on the quality scores provided by the consumers (e.g., through an average or weighted average, such as weighted based the time period of the telephonic communication).

In FIG. 5, operation 501 receives a user request (e.g., voice or text) at a mobile device (e.g., a cellular phone) for a type of content information.

If operation 503 determines that the content information depends on the location of the mobile device, operation 505 determines location information of the mobile device (e.g., through a GPS receiver, Automatic Number Identification, a cellular location server).

Operation 507 transmits content information from a content provider to a user of the mobile device (e.g., through a wireless connection) where the content information contains information about an entity (e.g., a list of experts).

Operation 509 receives a user request at the mobile device to call the entity. For example the user may select an expert from a list of experts. Operation 511 determines a phone number of the mobile device. Operation 513 forwards the user request and the phone number to a routing station.

Operation 515 dials the phone number of the mobile device to make a first phone call. Operation 517 dials a phone number of the entity to make a second phone call. Operation 519 joins the first and second phone calls.

Operation 521 records information identifying the phone number of the entity and/or the phone number of the user for the phone call. In one embodiment, the media channel that provides the information about the entity is also determined and recorded.

Figure 6:
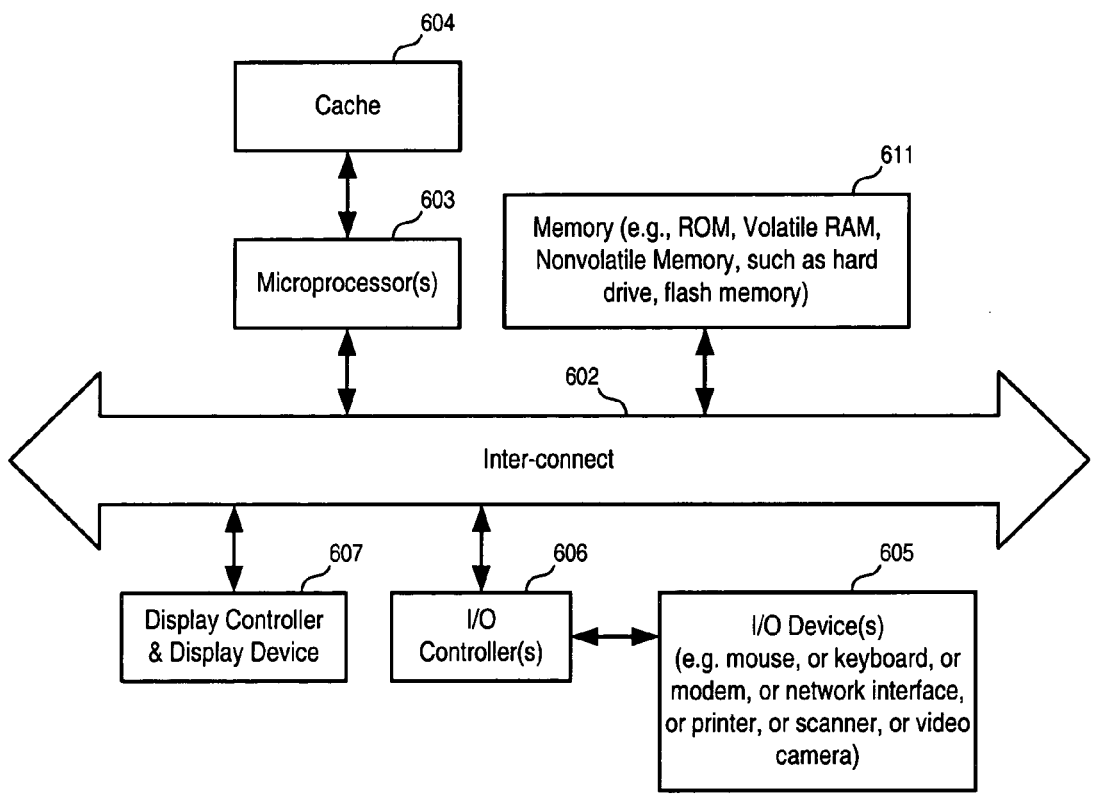
FIG. 6 shows a block diagram example of a data processing system which may be used with the present invention.

FIG. 6 shows a block diagram example of a data processing system which may be used with the present invention.

While FIG. 6 illustrates various components of a computer system, it is not intended to represent any particular architecture or manner of interconnecting the components. Other systems that have fewer or more components may also be used with the present invention.

In FIG. 6, the communication device (601) is a form of a data processing system. The system (601) includes an inter-connect (602) (e.g., bus and system core logic), which inter-connects a microprocessor(s) (603) and memory (611). The microprocessor (603) is coupled to cache memory (604) in the example of FIG. 6.

The inter-connect (602) interconnects the microprocess(s) (603) and the memory (611) together and also interconnects them to a display controller and display device (607) and to peripheral devices such as input/output (I/O) devices (605) through an input/output controller(s) (606). Typical I/O devices include mice, keyboards, modems, network interfaces, printers, scanners, video cameras and other devices which are well known in the art.

The inter-connect (602) may include one or more buses connected to one another through various bridges, controllers and/or adapters. In one embodiment the I/O controller (606) includes a USB (Universal Serial Bus) adapter for controlling USB peripherals, and/or an IEEE-1394 bus adapter for controlling IEEE-1394 peripherals.

The memory (611) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment of the present invention, a server data processing system as illustrated in FIG. 6 is used in an advice router to operate a database, to decode and route phone calls, to provide lists of experts to the customs (e.g., as running a Web or WAP server, a server for SMS center, a custom server, etc.), to initiate and join phone calls consumers and experts, to perform text-to-speech and/or voice recognition, to perform location determination computations, and/or to monitor telephonic connections, etc.

In one embodiment, a user terminal can be a data processing system similar to the system of FIG. 6, with more or less components. A data processing system as the user terminal can be in the form of a PDA, a cellular phone, a notebook computer, a personal desktop computer, etc.

Alternatively, the traditional communication client(s) may be used in some embodiments of the present invention.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention.

While some embodiments of the invention have been described in the context of fully functioning computers and computer systems, those skilled in the art will appreciate that various embodiments of the invention are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), among others, and transmission type media such as digital and analog communication links for electrical, optical, acoustical or other forms of propagated signals, such as carrier waves, infrared signals, digital signals, etc.

A machine readable medium can be used to store software and data which when executed by a data processing system causes the system to perform various methods of the present invention. The executable software and data may be stored in various places including for example ROM, volatile RAM, non-volatile memory and/or cache. Portions of this software and/or data may be stored in any one of these storage devices.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Aspects of the present invention may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions to implement the present invention. Thus, the techniques are not limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method, comprising:
   determining a location of a wireless mobile device;
   providing a list of experts of diverse advice sources to the wireless mobile device, without a user request, via a wireless media channel for presentation to a consumer, wherein the list is provided to the wireless mobile device according to the location of the wireless mobile device and in response to the wireless mobile device entering into a predefined district, the list comprising:
      information to indicate whether the experts are individually available to telephonically communicate with the consumer at a time when the list is provided to the consumer, and
      telephonic references of a phone router assigned to the experts, the telephonic references selectable to cause the wireless mobile device to call the phone router using the telephonic references, each of the telephonic references comprising an encoded target phone number associated with additional information comprising an identification of the wireless media channel used to deliver the list of experts to the mobile device;
   responsive to receiving a phone call from the wireless mobile device, via a communications channel different than the media channel, using one telephonic reference of the telephonic references of the phone router assigned to an expert selected from the list of experts, determining a telephonic reference of the expert and initiating a telephonic connection to the expert by the phone router using the telephonic reference of the expert to connect the phone call from the consumer to the expert; and
   providing compensation to the wireless media channel based on the use of the one telephonic reference for the phone call.

2. The method of claim 1, further comprising:
   joining the phone call from the mobile device and the telephonic connection to connect the expert and the consumer.

3. The method of claim 1, wherein the mobile device comprises a cellular phone.

4. The method of claim 3, wherein providing the list further comprises:
   performing text-to-speech on the list.

5. The method of claim 2, wherein the media channel comprises one of:
   a web-based channel;
   a wireless application protocol channel;
   a custom client-server channel over a wireless communication link; and
   a short message service based channel.

6. The method of claim 1, wherein the determining of the location of the mobile device comprises determining the location of the mobile device by one of:
   an automatic number identification based location determination system;
   a global positioning system receiver coupled to the mobile device; and
   a cellular communication system.

7. The method of claim 1, wherein providing the list comprises transmitting the list wirelessly in response to a search submitted from the mobile device.

8. The method of claim 7, wherein a request for the search is received as a voice input at the mobile device; the method further comprising:
   generating text for the search from the voice input using a speech recognition technique.

9. The method of claim 1, further comprising:
   prompting the consumer to provide a quality score for the expert.

10. The method of claim 1, wherein the list comprises information to individually indicate whether each of the experts is available to telephonically communicate with the consumer at a time when the list is provided to the consumer.

11. The method of claim 1, wherein the list comprises one of:
    an avatar representation for each of the experts;
    certification information for each of the experts;
    a compensation rate for each of the experts; and
    a quality score provided by previous consumers of the experts.

12. The method of claim 1, wherein the list is provided in response to one of:
    a selection of a category of experts; and
    a keyword search to match expert characteristics.

13. The method of claim 1, wherein the telephonic connection comprises at least one of:
    an internet telephony connection;
    voice over internet protocol; and
    a video connection.

14. The method of claim 1, further comprising:
monitoring how long the telephonic connection is maintained between the expert and the consumer;
wherein the consumer is charged based upon how long the telephonic connection is maintained.

15. A non-transitory machine readable medium containing instructions which when executed by a processor cause the processor to perform a method, comprising:
determining a location of a wireless mobile device;
providing a list of experts of diverse advice sources to the wireless mobile device, without a user request, via a wireless media channel for presentation to a consumer, wherein the list is provided to the wireless mobile device according to the location of the wireless mobile device and in response to the wireless mobile device entering into a predefined district, the list comprising:
information to indicate whether the experts are individually available to telephonically communicate with the consumer at a time when the list is provided to the consumer, and
telephonic references of a phone router assigned to the experts, the telephonic references selectable to cause the wireless mobile device to call the phone router using the telephonic references, each of the telephonic references comprising an encoded target phone number associated with additional information comprising an identification of the wireless media channel used to deliver the list of experts to the mobile device;
responsive to receiving a phone call from the wireless mobile device, via a communications channel different than the media channel, using one telephonic reference of the telephonic references of the phone router assigned to an expert selected from the list of experts, determining a telephonic reference of the expert and initiating a telephonic connection to the expert by the phone router using the telephonic reference of the expert to connect the phone call from the consumer to the expert; and
providing compensation to the wireless media channel based on the use of the one telephonic reference for the phone call.

16. A system, comprising:
a phone router;
a computer server to determine a location of a wireless mobile device and to provide a list of experts of diverse advice sources to the wireless mobile device via a wireless media channel for presentation to a consumer, wherein the list is provided, without a user request, to the wireless mobile device according to a location of the wireless mobile device and in response to the wireless mobile device entering into a predefined district the list comprising at least one telephonic reference of the phone router, the telephonic reference being assigned by the phone router to one expert of the experts, and the telephonic reference being selectable to cause the wireless mobile device to call the phone router using the telephonic reference, the telephonic reference comprising an encoded target phone number associated with additional information comprising an identification of the wireless media channel used to deliver the list of experts to the mobile device; and
wherein the phone router is configured to, responsive to receiving a first phone call from the wireless mobile device using the telephonic reference, determine a telephone number of the expert using the telephonic reference used to receive the first phone call, initiate a second phone call to the expert using the telephone number of the expert, and join the first and second phone calls to provide a telephonic connection between the expert and the consumer; and
providing compensation to the wireless media channel based on the use of the one telephonic reference for the first phone call.

* * * * *